Sept. 7, 1948.   N. JOHNSON ET AL   2,448,889
PROXIMITY FUSE TESTING APPARATUS
Filed Sept. 16, 1944   2 Sheets-Sheet 1

INVENTORS
NELS JOHNSON
WILLIAM E. BRADLEY
BY
ATTORNEY

Sept. 7, 1948.   N. JOHNSON ET AL   2,448,889
PROXIMITY FUSE TESTING APPARATUS
Filed Sept. 16, 1944   2 Sheets-Sheet 2

INVENTORS
NELS JOHNSON
WILLIAM E. BRADLEY
BY
ATTORNEY

Patented Sept. 7, 1948

2,448,889

UNITED STATES PATENT OFFICE 2,448,889

PROXIMITY FUSE TESTING APPARATUS

Nels Johnson, Lower Merion Township, Montgomery County, and William E. Bradley, Swarthmore, Pa., assignors, by mesne assignments, to Philco Corporation, Philadelphia, Pa., a corporation of Pennsylvania Application September 16, 1944, Serial No. 554,384

11 Claims. (Cl. 73—1)

Our invention relates to an improved measuring and testing unit for testing radio proximity fuses in order to determine the height above ground at which they will operate.

A radio proximity fuse is a device which operates a fuse to explode a bomb at a definite height of the bomb above the ground. The apparatus usually consists of a radio transmitter and a radio receiver both located on the bomb, and using the same antenna.

As the bomb approaches the earth, the radiation resistance of the antenna undergoes cyclical variations, which increase in amplitude as the bomb gets closer to the earth. This cyclical variation in impedance is measured by the radio receiver. When these cyclical variations reach a predetermined amplitude determined by the position of the bomb in space, the fuse is ignited and the bomb explodes.

The purpose of our novel simulator is to obtain a means of simulating the falling bomb as it approaches the earth so that the necessary tests required for the performance of the fuse may be made and have them represent the actual performance of the bomb in use.

To this end our invention contemplates a simulator which is compact, rigid, completely shielded, and which above all, has very close coupling to the antenna of the fuse.

Previous simulators used a resistive strip to produce the loading. Some were used in unshielded conditions, but others used non-rigid bulky shielded boxes in which weak but critical coupling was used between the antenna ring and the loading network.

By constructing our simulator so that the fuse is completely shielded and the antenna ring is closely coupled to the loading network, it is possible to obtain a much broader band width, which then is not too critical to touch, and in which all the radiated energy is under our control. Incorporated with this we have a method of driving the generator of the fuse unit as well as a means of testing the overall sensitivity.

Previous methods of testing these fuse units have been developed on the theory that to simulate actual operating conditions, the fuse should be as far removed from other objects as possible. It is impossible to provide complete isolation of the fuse in a resasonable space, so shielding was employed to prevent variations in surrounding objects from affecting the tests. However, this shield was placed as far away from the fuse as possible to reduce the effect of the shield upon the measurements. This device was comparatively non-rigid and was subject to troubles from vibration set up by the rotation of the generator propeller, which rotates at speeds between 20,000 and 40,000 revolutions per minute. Also, in previous methods of testing, the fuse antenna was weakly coupled to a variable resistance which simulated the approach of the bomb to the ground. This weak coupling proved to be a cause of difficulty, since it was too critical and was therefore responsible for noisy and erratic results.

In our invention, we rejected the theory that the shield should be as far away from the fuse antenna as possible. Instead we construct a small, rigid shield. Then we build a coupling element in the shape of a ring surrounding the antenna of the fuse. This coupling ring is then tightly coupled to the antenna so that the impedance effectively placed between the antenna and the shield, which is to simulate the radiation resistance of the antenna, is substantially the impedance between the coupling ring and the shield. The nearness of this coupling ring to the shield results in the presence of a capacitance between the coupling ring and the shield. This capacitance is compensated by an inductance of the proper magnitude placed between the ring and the shield. Then we are free to simulate the radiation resistance of the fuse antenna by a resistor placed between the coupling ring and the shield. Actually we use a vacuum tube and lumped resistor to do this, comprising essentially the circuit arrangement disclosed in the co-pending application of Richard A. Bell, Serial No. 551,186, filed August 25, 1944.

Thus, in accordance with our invention, we simulate all the actual conditions obtained in the flight of the bomb toward the earth. The power supplied to the bomb is obtained from a wind driven generator. In order to operate this generator, the bomb fuse is either placed in a blast of air or is driven from a shaft. This means that there is considerable vibration and provision is made to adequately protect against this vibration.

We provide for properly shielding the test apparatus to obtain precise results at the frequencies involved. Electrical loading is provided, consisting of a parallel inductance, capacitance and resistance combination connected to the casting and to a coupling ring, the values of the constants being governed by the R. F. frequency. The coupling ring is a cylinder having a length and a diameter slightly larger than the antenna ring and being rigidly supported in the casting by insulating supports. The inductance is approximately equal to that which is necessary to resonate the capacitance of the coupling ring to the casting and the capacitance of an air trimmer capacitor used for tuning purposes. This air trimmer is calibrated at different frequencies over the operating range of fuse units so as to make the reactance of the simulator compare with that of the actual bomb in free space. The resistance load is chosen to produce the same loading as the radiation resistance of the unit when attached to the bomb in free space. The unit can be driven by either a motor coupled to the shaft by a belt, or by air issuing out of a multiple nozzle mounted on a dielectric tubing projecting through the bottom into the interior of the casting.

The resistive load consists of a fixed resistor, in series with the parallel combination of a cathode bias resistor of a pentode modulator tube and the high frequency resistance from cathode to plate of the pentode modulator tube. For static measurements the resistive load is constant, but for dynamic measurements the resistive load can be varied at an audio rate by a signal on the control grid of the pentode modulator tube which causes the transconductance of the pentode to vary at the audio rate. In this manner the load variations can be made to simulate the variations in radiation resistance as the bomb approaches a reflecting surface. An indicator is associated with the apparatus to show when the audio signal is sufficient to fire the fuse unit. The strength of the necessary audio signal to fire the unit is inversely proportional to the overall sensitivity of the fuse unit.

Accordingly we have as an object of our invention to provide a novel test equipment for determining the operating point of a proximity fuse.

A further object of our invention is to provide a novel circuit arrangement and apparatus which simulates actual conditions met by a bomb dropping toward the earth.

These and other objects will be clear from the detailed description which is to follow in connection with the drawings in which Figure 1 shows a cross-sectional view of the housing for the testing unit.

Figure 2:
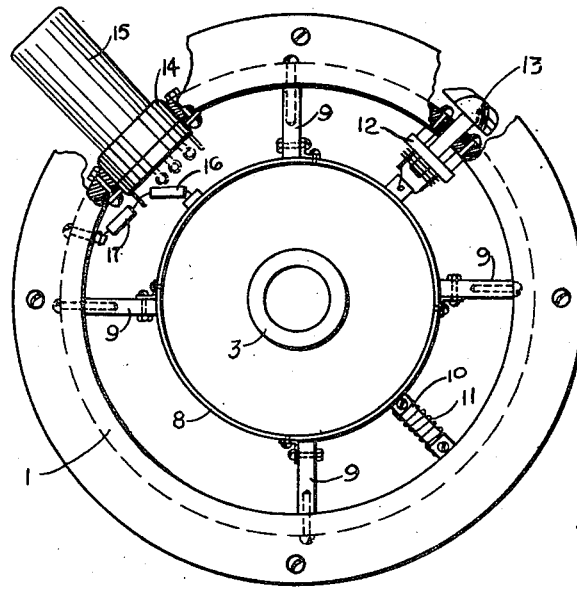
Figure 2 shows a view looking into the top of the testing unit with the cover plate removed.
Figure 1:
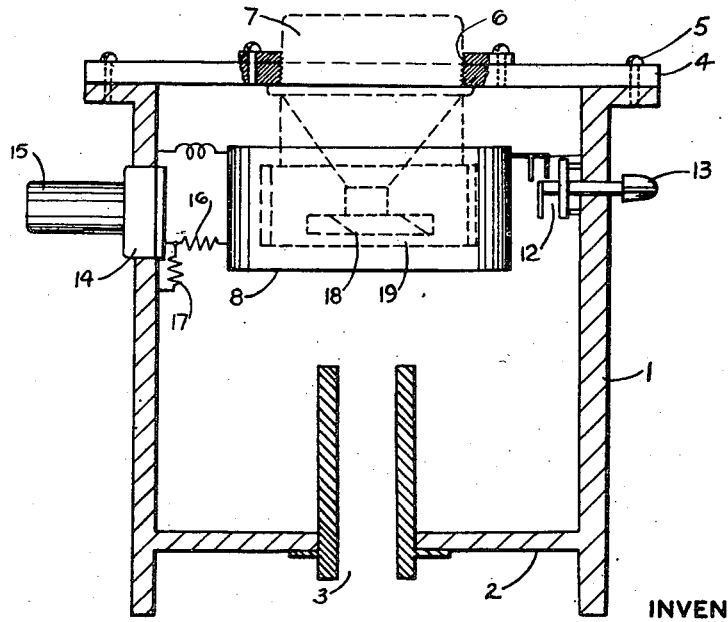

Referring now to Figures 1 and 2, the primary mechanical part of the testing unit comprises a heavy cast cylinder 1, having about 7" inside diameter and 9" height with a wall thickness of 3/8" and being almost closed at the bottom by a diaphragm 2 which forms a part of the casting. In diaphragm 2 there is an opening through which there is inserted a tubular piece 3 which provides a method of inserting a drive to the propeller blades 18 which drive the generator of the fuse 7. This drive may be an air blast or it may be a rotating shaft.

The top of the cylinder is closed by a steel plate 4 provided with fastening screws 5. In the center of this steel plate there is a circular opening 6 into which the radio proximity fuse 7 under test is mounted in place ready for test.

Figure 4:
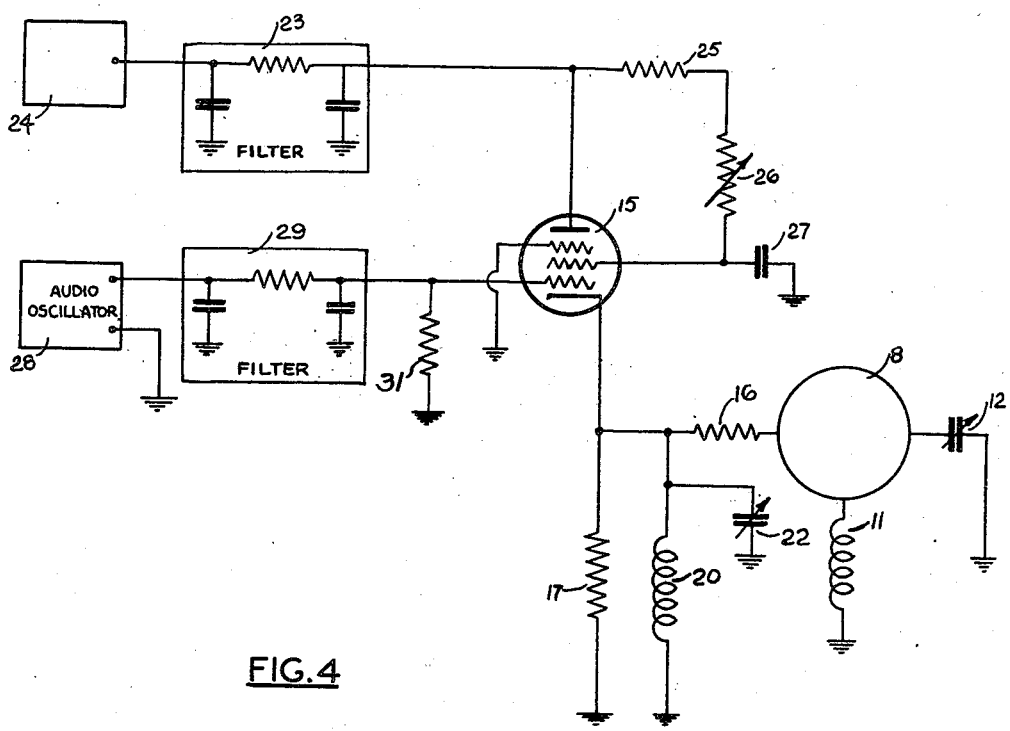
Figure 4 is a more complete schematic diagram of the electrical testing part of the circuit.

Immediately below the opening 6 there is a cylindrical metallic ring 8 having a diameter slightly larger than the antenna ring 19 of the fuse unit, which serves to capacitively couple the simulator circuit to the antenna of the fuse. This ring is supported from the walls of the cylinder by four insulating supports 9. Between the antenna coupling ring and the outer wall, there are connected a small trimmer capacitor 12 which is operated by knob 13 and an insulating member 10 over which there is wound a coil of wire serving as an inductance coil 11. In the wall of the cylinder there is a socket 14 for a vacuum tube 15. Between the antenna coupling ring 8 and one of the terminals of the socket there is connected a resistor 16. Between this connection on the socket and the case of the unit there is connected another resistor 17. The further details of the electrical circuit are shown in Figure 4.

As already described in connection with Figure 1, the antenna 19 of the fuse unit 7 is mounted within the coupling ring 8 and the wind operated propeller 18 for driving the generator which supplies the power to the radio fuse is mounted within the antenna in a sturdy and rugged structure which makes possible extreme electrical simplicity.

The electrical operation of the unit will be described in connection with Figures 3 and 4.

The cathode of tube 15 has a stray capacitance 21 to ground, the effect of which is counterbalanced by the inductance coil 20 and the small trimmer capacitor 22 which is used in the final adjustment of this circuit to give resonance between inductance 20 and the sum of capacitances 21 and 22. The plate of tube 15 is supplied from a power supply 24 through a filter 23 composed of resistors and capacitors which prevent radio frequency signals from getting back into the power supply. The screen grid circuit of tube 15 is supplied through two resistors 25 and 26; the latter being adjustable in order that final adjustment may be made. This screen grid is bi-passed to ground through capacitor 27. The grid of tube 15 is fed from an audio-oscillator 28 through a filter 29 which again is composed of resistors and capacitors to prevent radio frequency signals from getting back into the oscillator. Resistor 31 acts as a grid leak resistor.

Figure 3:
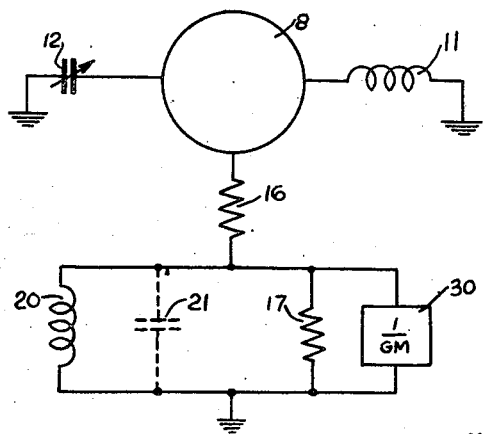
Figure 3 is a schematic diagram in simplified form of the electrical testing part of the circuit.

The electrical theory of operation can best be determined from a study of Figure 3 and Figure 4. From Figure 4 it will be noted that the only electrode of tube 15 which is not grounded or by-passed to ground as far as the radio frequency signal is concerned is the cathode. As a result of this, the impedance which the electronic operation of the tube contributes to the impedance between cathode and ground is the mutual conductance $G_m$ of the tube divided into unity. This is shown at 30 in Figure 3.

This mutual conductance depends upon the voltage of the grid and consequently the variation in voltage on the grid will cause a variation in this mutual conductance. Thus, the audio frequency oscillator will cause unit 30 to vary its resistance cyclically at the audio frequency rate of the oscillator 28 and in proportion to the voltage output of the oscillator. The impedance between the antenna coupling ring 8 and ground is then made up of all of the elements shown in Figure 3.

Inductance 11 is of such a value that it a little more than counterbalances the stray capacitance between the antenna coupling ring and the shield or "ground." Capacitor 12 is set so that the sum of its capacitance and the stray capacitance are nearly counterbalanced by the inductance 11. The reactance of these elements in parallel can then be set by adjustment of capacitor 12 to the value which the antenna will have when the bomb is in free space.

Inductor 20 and capacitors 21 and 22 are set so that they neutralize each other. Thus the resistance between the antenna coupling ring 8 and ground is composed of resistor 16 in series with parallel resistances 17 and 30. Resistance 30 is varied in accordance with the voltage and frequency of the audio frequency oscillator. This then causes a variation in the resistance between the antenna coupling ring and ground.

The antenna coupling ring is coupled to the antenna of the fuse unit by the inherent capacitance between these two units. The reactance of this capacitance is so small at the frequency of use that the antenna might just as well be connected directly to the coupling ring, as far as the radio frequency is concerned. The physical arrangement of the ring shape is desirable, however, since it makes insertion of the fuse into the testing unit easy. Moreover, small misalignments of the fuse, or vibrations of the fuse do not disturb the measuring circuit because with the ring shape coupling unit, the inherent capacitance is practically unchanged by small variations in the position of the antenna ring 19.

It is the variation in resistance which simulates the variation in radiation resistance of the antenna as the bomb falls towards the earth. The approach of the bomb to the earth is simulated by increasing the voltage output of the audio oscillator. In this manner the load variation can be made to simulate the variations in radiation resistance as the bomb approaches a reflecting surface. An indicator is associated with the fuse under test and operated by energy impressed in the antenna as described to show when the audio signal is sufficient to fire the fuse unit. The strength for the necessary audio signals to fire the unit is inversely proportional to the overall sensitivity of the fuse unit.

Various modifications of the principles of our invention will now be apparent to those skilled in the art, and accordingly we prefer not to be bound by the detailed description above, but only by the appended claims.

We claim:

1. A testing unit for testing a radio proximity fuse unit and its antenna comprising a metallic housing for electrically shielding the fuse unit, a ring shaped coupling element surrounding the antenna of said fuse unit tightly coupled to said antenna at the operating frequency of said fuse, means for inserting an impedance between said coupling element and said housing to simulate the radiation resistance of said antenna, and means for balancing out the capacitance between said coupling ring and said housing.

2. A testing unit for testing a radio proximity fuse having an antenna comprising a metallic housing for electrically shielding the fuse unit, a ring shaped coupling element surrounding the antenna of said fuse unit tightly coupled to said antenna at the operating frequency of said fuse, means for inserting an impedance between said coupling ring and said housing to simulate the radiation resistance of said antenna, and means comprising an inductance placed between said ring and said housing for balancing out the capacitance between said coupling ring and said housing.

3. A testing unit for testing a radio proximity fuse having an antenna comprising a metallic housing for electrically shielding the fuse unit, a ring shaped coupling element surrounding the antenna of said fuse unit tightly coupled to said antenna at the operating frequency of said fuse, means for inserting an impedance between said coupling ring and said housing to simulate the radiation resistance of said antenna, a trimmer condenser connected between said ring and said housing, and means comprising an inductance, approximately equal to that necessary to resonate the combined capacitance of said coupling ring to said housing and said trimmer condenser, placed between said ring and said housing for balancing out the capacitance between said coupling ring and said housing.

4. A testing unit for testing a radio proximity fuse having an antenna comprising a metallic housing for electrically shielding the fuse unit, a coupling ring surrounding the antenna of said fuse unit tightly coupled to said antenna at the operating frequency of said fuse, a vacuum tube mounted in said housing and having a cathode bias resistor, and means for inserting a resistance load between said coupling ring and said housing for simulating the radiation resistance of said fuse antenna and comprising a fixed resistor in series with the parallel combination of said tube cathode bias resistor and the high frequency cathode-to-plate resistance of said tube.

5. A testing unit for testing a radio proximity fuse having an antenna comprising a metallic housing for electrically shielding the fuse unit, a coupling ring surrounding the antenna of said fuse unit tightly coupled to said antenna at the operating frequency of said fuse, means including a vacuum tube and lumped resistors for inserting a resistance between said coupling ring and said housing for simulating the radiation resistance of said fuse antenna, and means for varying the resistive load of said tube at audio frequency rate.

6. A testing unit for testing a radio proximity fuse having an antenna comprising a metallic housing for electrically shielding the fuse unit, a top plate for said housing having an opening, means for mounting said fuse unit to be tested including the antenna thereof in said opening, a simulator circuit for simulating the radiation resistance of said antenna, a metallic ring having a diameter slightly larger than said antenna for capacitatively coupling said simulator circuit to said fuse antenna insulatedly supported from the walls of said housing, said simulator circuit comprising means for inserting an impedance between said ring and said housing to simulate the radiation resistance of said antenna, and means for neutralizing the capacitance between said ring and said housing.

7. A testing unit for testing a radio proximity fuse having an antenna comprising a metallic housing for electrically shielding the fuse unit, a top plate for said housing having an opening, means for mounting said fuse unit to be tested including the antenna thereof in said opening, a simulator circuit for simulating the radiation resistance of said antenna, a metallic ring having a diameter slightly larger than said antenna for capacitatively coupling said simulator circuit to said fuse antenna insulatedly supported from the walls of said housing, said simulator circuit comprising means including a vacuum tube for inserting an impedance between said ring and housing to simulate the radiation resistance of said antenna, means for neutralizing the capacitance between said ring and said housing, and means for neutralizing the capacitance between said tube and said housing.

8. A testing unit for testing a radio proximity fuse including an antenna comprising a metallic housing for electrically shielding the fuse unit, a top plate for said housing having an opening, means for mounting said fuse unit to be tested including the antenna thereof in said opening, a simulator circuit for simulating the radiation resistance of said antenna, a metallic ring having a diameter slightly larger than said antenna for capacitatively coupling said simulator circuit to said fuse antenna insulatedly supported from the walls of said housing, said simulator circuit comprising means including a vacuum tube for inserting an impedance between said ring and housing to simulate the radiation resistance of said antenna, means for neutralizing the capacitance between said ring and said housing, means for neutralizing the capacitance between said tube and said housing, a resistor connecting the cathode of said tube to said ring, and a resistor extending from said connection to said housing.

9. A testing unit for testing a radio proximity fuse including an antenna comprising a metallic housing for electrically shielding the fuse unit, a top plate for said housing having an opening, means for mounting said fuse unit to be tested including the antenna thereof in said opening, a simulator circuit for simulating the radiation resistance of said antenna, a metallic ring having a diameter slightly larger than said antenna for capacitatively coupling said simulator circuit to said fuse antenna insulatedly supported from the walls of said housing, said simulator circuit comprising means including a vacuum tube for inserting an impedance between said ring and housing to simulate the radiation resistance of said antenna, means for neutralizing the capacitance between said ring and said housing, and means for neutralizing the capacitance between said tube and said housing, said fuse unit antenna and coupling ring having capacitance coupling of such a value as to constitute substantially a direct connection at the operating radio frequency of the fuse.

10. A testing unit for testing a radio proximity fuse including an antenna comprising a metallic housing for electrically shielding the fuse unit, a top plate for said housing having an opening, means for mounting said fuse unit to be tested including the antenna thereof in said opening, a simulator circuit for simulating the radiation resistance of said antenna, a metallic ring having a diameter slightly larger than said antenna for capacitatively coupling said simulator circuit to said fuse antenna insulatedly supported from the walls of said housing, a trimmer condenser connected between said ring and housing, an inductance connected between said ring and housing and means for inserting an impedance between said ring and housing to simulate the radiation resistance of said antenna.

11. A testing unit for testing a radio proximity fuse including an antenna comprising a metallic housing for electrically shielding the fuse unit, a top plate for said housing having an opening, means for mounting said fuse unit to be tested including the antenna thereof in said opening, a simulator circuit for simulating the radiation resistance of said antenna, a metallic ring having a diameter slightly larger than said antenna for capacitatively coupling said simulator circuit to said fuse antenna insulatedly supported from the walls of said housing, a trimmer condenser connected between said ring and housing, an inductance connected between said ring and housing, a vacuum tube having a screen grid mounted in said housing, a resistor connecting the cathode of said tube to said ring, a resistor extending from said cathode to said housing, and means for inserting an impedance between said ring and said housing to simulate the radiation resistance of said antenna.

NELS JOHNSON.
WILLIAM E. BRADLEY.

REFERENCES CITED

The following references are of record in the file of this patent:

UNITED STATES PATENTS

| Number | Name | Date |
|---|---|---|
| 2,341,243 | Schock | Feb. 8, 1944 |